Figure 1:
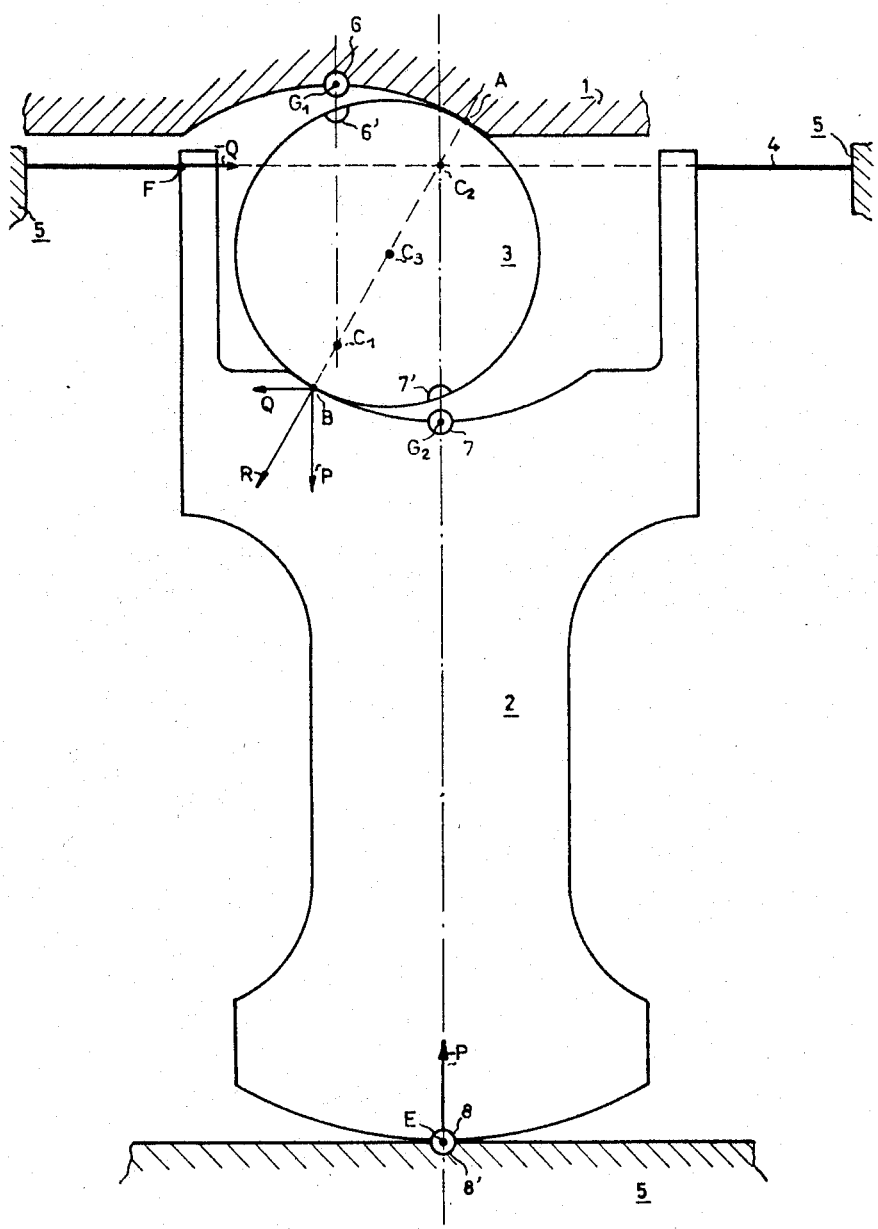

Nov. 8, 1966

G. L. FOURETIER 3,284,749

STRAIN GAUGE DYNAMOMETER

Filed April 5, 1965

2 Sheets-Sheet 1

INVENTOR
GEORGES L. FOURETIER
BY
Abraham A. Saffitz
ATTORNEY

United States Patent Office 3,284,749
Patented Nov. 8, 1966

3,284,749
STRAIN GAUGE DYNAMOMETER
Georges L. Fouretier, Paris, France, assignor to Société d'Études et de Réalisations d'Installations de Mesure, Bagnolet, France, a company of France
Filed Apr. 5, 1965, Ser. No. 445,569
Claims priority, application France, Apr. 10, 1964, 970,494
3 Claims. (Cl. 338—5)

The present invention relates to strain gauge dynamometer working under compression.

Particularly in the case of the weighing of a tank or other storage means, the deformations undergone by the container for any reason frequently entail the decentering of the points of application of the stresses and the obliquity of the latter in relation to the axial direction of the dynamometer. In order to prevent such decentering and obliquity, it is known to utilise stabiliser bars, which are horizontal or more generally perpendicular to the stress to be measured and which, in order not to oppose the deformations of the tank due for example to its expansion, lead to complex, cumbersome, and expensive structures.

It is also known to construct stabiliser arrangements of reduced dimensions by making use of the combination of a horizontal diaphragm and a ball-type link, but in existing systems the stresses withstood by the sensitive element of the dynamometer bar are not reduced to a pure compression, which has the effect of reducing the accuracy, sensitivity, and the capacity of the dynamometer.

The object of the present invention is to provide a solid bar strain gauge dynamometer provided with a stabilising device of the diaphragm and ball type, of such nature that the dynamometer will be at the same time simple and smaller, and therefore less expensive, while remaining sensitive and accurate even when subjected to considerable decentered and/or oblique stresses.

A strain gauge dynamometer assembly comprises a casing, a solid elongated dynamometer bar of revolution having its lower end resting upon the bottom of said casing, a first spherically shaped bowl portion of a given diameter at the upper end of said bar, a stress-transmitting base, a second spherically shaped bowl portion of the same diameter as the first in the underpart of said base, a spherical ball having a diameter smaller than the diameter of said first and second bowl portions inserted between said bowl portions, a flat annular diaphragm secured to said casing along its outer periphery and to said bar along its inner periphery and located in the plane transverse to said bar passing through the center of curvature of the first spherically shaped bowl portion and wire strain gauges bonded to said bar.

Figure 2:
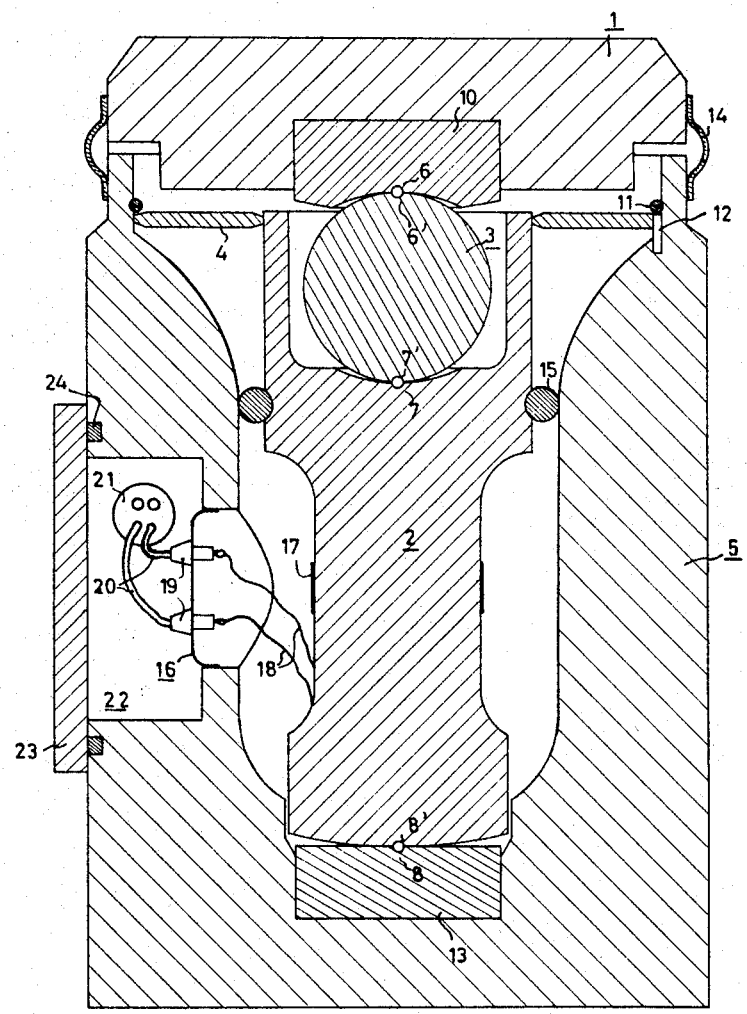

Other characteristics and advantages of the dynamometer according to the invention will be clear from reading the detailed description which follows, in conjunction with a perusal of the accompanying drawings, in which:

FIG. 1 is a basic diagram of the dynamometer according to the invention, which is shown subjected to a decentered stress; and FIG. 2 is an axial cross-sectional view of a dynamometer of this type according to a preferred embodiment.

Referring first to FIGURE 1, a movable upper base 1 bears on a solid dynamometer bar of revolution 2 by means of a ball 3. The ball 3, having its center at $C_3$ and having a diameter $d$, is adapted to roll between a top bowl connected to the base 1 and a bottom bowl connected to the bar 2, these two bowls being spherical and having respective centers $C_1$ and $C_2$ and the same diameter $D$. The bar 2 rests on the fixed, flat base of a casing 5 which encloses it, at a fixed point E. The bar 2 is likewise provided with a flat diaphragm 4 securely attached to casing 5.

By construction the straight line $EC_2$ is the axis of the bar 2 and the middle plane of the diaphragm 4 perpendicular to said axis passes through the center $C_2$ of the bottom bowl.

If the base 1 is centered on the bar, the same is true of the ball and the entire apparatus is then a body of revolution about the axis $EC_2$. As the result of a lateral displacement of the base 1 in a direction which defines with the axis $EC_2$ a plane which is a radial plane of symmetry taken as the plane of FIG. 1, the ball has rolled on the two bowls. The radii of contact $C_1C_3A$ and $C_2C_3B$ having turned through the same angle in the plane of FIG. 1, the two centers $C_1$ and $C_2$ are once again in alignment with $C_3$ on the line AB which is a diameter of the ball.

The force applied by the base 1 to the ball 3 and the force transmitted by said ball to the bar 2 are directed along AB. The force R thus applied at B to the bar 2 therefore passes through $C_2$. The flat diaphragm 4 transmits to the bar 2 a reaction situated in its middle plane. This reaction is therefore a horizontal force Q′ which because of symmetry is in the plane of FIG. 1 and therefore passes through $C_2$. The reaction of the base of the casing 5 is a force P′ applied at E and necessarily passing through $C_2$, which is thus the meeting point of the three forces applied to the bar.

The bar 2 in its sensitive part is thus subjected to a purely axial stress and its neutral line cannot deflect.

The bar 2 is held centered in the axis of the casing 5 by means of the diaphragm 4 and of a centering bead 8 having E as its center, secured to the bar and entering freely a corresponding socket 8′ in the base of the casing 5. Centering beads 6 and 7 having as their respective centers the poles $G_1$ and $G_2$ of the spherical bowls are provided respectively in these bowls and enter freely the corresponding sockets 6′ and 7′ provided at diametrically opposite points on the ball 3. In these conditions, it is ensured that starting from its centered position in which the ball touches the two bowls at diametrally opposite points, after having rolled on the two bowls along arcs which are equal by construction, the new points of contact A and B will remain diametrally opposite.

Referring now to FIG. 2, which is a longitudinal section of a dynamometer according to the invention, it is seen that the elements corresponding to those in FIG. 1 carry the same reference numerals.

The upper base 1 is provided with a plate 10, for example of hard steel, in which the upper bowl is cut, the latter carrying the centering bead 6. The bar 2 has a widened head in which a cavity serving to receive the ball 3 is provided. In the bottom of this cavity the bottom bowl is cut, the latter receiving the centering bead 7. The ball 2 has diametrally opposite sockets 6′ and 7′. The common sphericity diameter D of the two bowls is slightly less than twice the diameter $d$ of the ball, so that the diaphragm is situated slightly below the top point of the centered ball.

The diaphragm 4 is force-fitted to the bar 2, which for that purpose is grooved in its widened part; on the other hand, it is securely, yet movably clamped to the casing 5 so as to be able to resume its flat shape as soon as it is no longer subjected to a horizontal stress. Its inside and outside peripheries are bevelled symmetrically in relation to its middle plane in order to give better definition of the position of the acting plane of the diaphragm. The displacements of the diaphragm are limited in the vertical direction by a retaining ring 11 which allows it only slight play, and in respect of rotation by a pin 12 passing into a notch in the periphery, which likewise has the effect of preventing the bar from turning about its vertical axis.

The bar 2 ends a the bottom in the form of a spherical surface having a large radius. It rests on a washer 13, for example of hard steel, and having a flat upper surface, which is housed in the bottom of the casing 5. The centering bead 8 which together with the bead 7 defines the geometrical axis of the bar is mounted in the terminal face of the bar 2 and a corresponding socket 8' is provided in the top face of the washer 13. When the casing 5 rests on a horizontal base the axis 7–8 of the bar is perfectly vertical.

It will be observed that the top stress-transmitting base 1 has a cylindrical step intended to limit the amplitude of its decentering. As the decentering of the base is constantly equal to twice that of the ball, the play thus permitted to the base 1 in the casing 5 is slightly less than twice the play allowed the ball in its housing in the top of the bar 2.

The dynamometer is also provided with a certain number of means for protecting it against weather and industrial dirt. Thus the upper base 1 is connected to the casing 5 by a very flexible diaphragm of revolution 14 forming a bridge between the base and the casing. The toric diaphragm 14 and the terminal carrier plate 16 hermetically seal the chamber containing the operative portion of the bar 2. Along the sensitive central portion of the bar 2 there have been illustrated two diametrally opposite gauges 17 which are extended by connection wires 18 leading to terminals 19 which are the starting points for conductors 20 belonging to a connection cable 21. The junction box 22 where this connection is made is hermetically sealed by a cover 23 provided with a seal 24.

The expression "ball of diameter $d$" applied to the part 3 signifies that the surfaces of that part which are required to roll in the bowls belong to one and the same spherical surface. This does not mean that the part 3 necessarily as a whole has a spherical shape. In order for example to reduce to a minimum the diameter of the widened head of the bar 2, it is therefore possible to connect spherical rolling domes by any surface inside the sphere, for example by a cylindrical surface of revolution of a diameter smaller than $d$.

What I claim is:

1. A strain gauge dynamometer assembly comprising a casing, a solid elongated dynamometer bar of revolution having its lower end resting upon the bottom of said casing, a first spherically shaped bowl portion of a given diameter at the upper end of said bar, a stress-transmitting base, a second spherically shaped bowl portion of the same diameter as the first in the underpart of said base, a spherical ball having a diameter smaller than the diameter of said first and second bowl portions inserted between said bowl portions, a flat annular diaphragm secured to said casing along its outer periphery and to said bar along its inner periphery and located in the plane transverse to said bar passing through the center of curvature of the first spherically shaped bowl portion and wire strain gauges bonded to said bar.

2. A strain gauge dynamometer assembly comprising a casing, a solid elongated dynamometer bar of revolution having its lower end resting upon the bottom of said casing, a first spherically shaped bowl portion of a given diameter at the upper end of said bar, a first centering bead affixed to said first bowl portion at the pole of the same, a stress-transmitting base, a second spherically shaped bowl portion of the same diameter as the first in the underpart of said base, a second centering bead affixed to said second bowl portion at the pole of the same, a spherical ball having a diameter smaller than the diameter of said first and second bowl portions inserted between said bowl portions, two diametrically opposite hollow sockets in said ball adapted to receive said first and second centering beads, a flat annular diaphragm secured to said casing along its outer periphery and to said bar along its inner periphery and located in the plane transverse to said bar passing through the center of curvature of the first spherically shaped bowl portion and wire strain gauges bonded to said bar.

3. A strain gauge dynamometer assembly comprising a flat bottom casing, a solid elongated dynamometer bar of revolution around an axis, said bar having a rounded lower end resting upon the flat bottom of the casing, a first spherically shaped bowl portion of a given diameter of revolution about said axis at the upper end of said bar, a stress-transmitting base, a second spherically shaped bowl portion of the same diameter as the first in the underpart of said base, a spherical ball having a diameter smaller than the diameter of said first and second bowl portions inserted between said bowl portions, a flat annular diaphragm secured to said casing along its outer periphery and to said bar along its inner periphery and located in the plane transverse to said bar passing through the center of curvature of the first spherically shaped bowl portion and wire strain gauges bonded to said bar.

References Cited by the Examiner

UNITED STATES PATENTS

| | | | |
|---|---|---|---|
| 2,439,146 | 4/1948 | Ruge | 338—5 X |
| 2,761,670 | 9/1956 | Fouretier | 338—5 X |
| 2,775,887 | 1/1957 | Hines | 73—141 |

RICHARD M. WOOD, *Primary Examiner.*

W. D. BROOKS, *Assistant Examiner.*